Sept. 12, 1961     H. PAPRITZ     2,999,422
SLIT LAMP
Filed Dec. 3, 1957     3 Sheets-Sheet 1
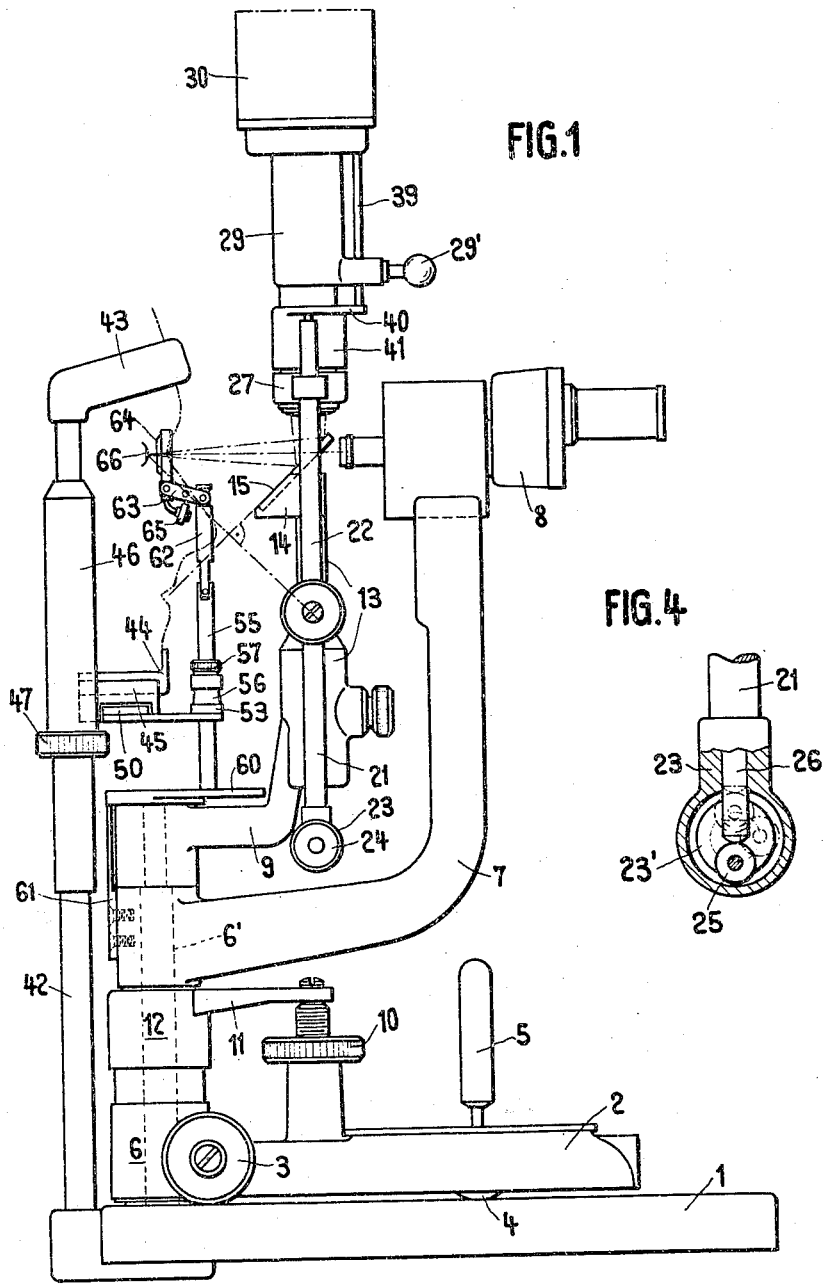
INVENTOR
Hans Papritz
BY
ATTORNEY

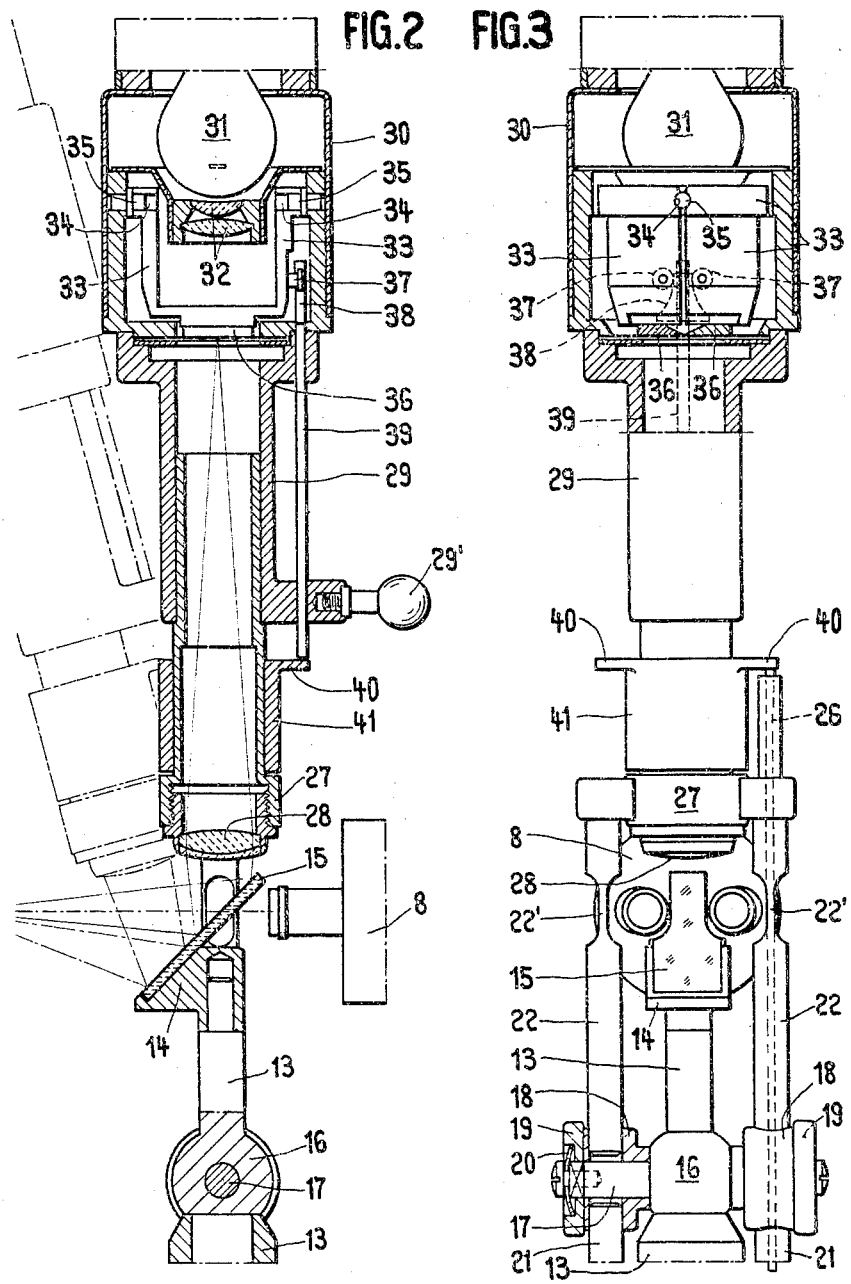

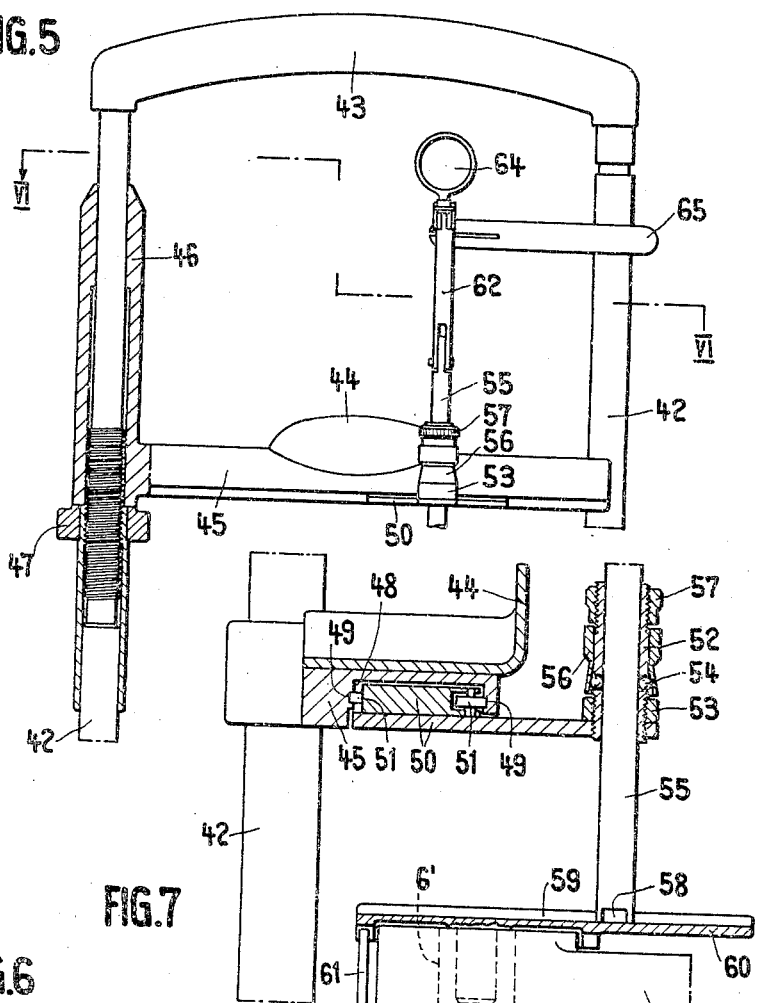
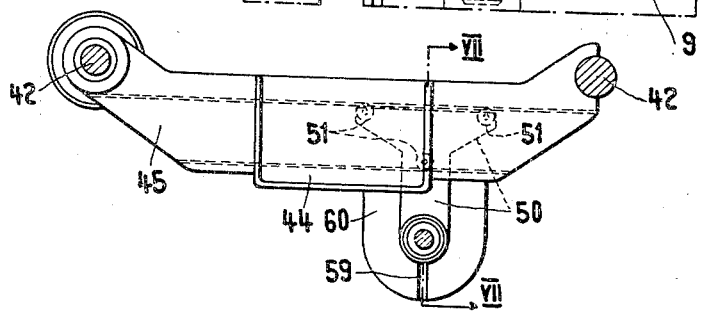

Patented Sept. 12, 1961

2,999,422
SLIT LAMP
Hans Papritz, Liebefeld-Berne, Switzerland, assignor to Haag-Streit A.G., Liebefeld-Berne, Switzerland
Filed Dec. 3, 1957, Ser. No. 700,312
Claims priority, application Switzerland Dec. 28, 1956
7 Claims. (Cl. 88—20)

This invention relates to a slit lamp for microscopic examination of the eye, of the type having an illuminating device for projecting a flat light beam into the eye and a microscope for observation of the eye. In the following description and in the claims "the eye" always means the eye of a person, examined with the slit lamp according to this invention.

With well known slit lamps it was usual to project a light beam or pencil of rays having a flat and vertically elongated cross section into the eye to be examined, whereby the axis of the light beam was at an angle to the optical axis of the microscope and more generally speaking to the direction in which the eye is observed. In order to adjust the desired angle of incidence of the light beam as well as the direction in which the eye is observed independently from each other, the said illuminating device and the microscope are individually pivotable on a common vertical axis passing through the locus of the sharp image of the slit diaphragm of the illuminating device.

In order to effect examination of the eye with a very small or no angular deviation between the optical axis of the microscope and the light beam it has already been proposed to locate the illuminating device between the eye and the microscope in such a way that the illuminating device and the microscope may freely be turned to any desired angular position without hindering each other. With this arrangement it is possible to adjust any desired angle between the light beam and the observing direction.

While the slit lamp usually operates with a light beam of vertically elongated cross section or simply designated as a "vertical light beam" in the following description, it may often be desirable to project a flat light beam having a horizontally elongated cross section, or simply designated as a "horizontal light beam" in the following description, into the eye to be examined, whereby the direction of incidence of this horizontal light beam is required to form an angle with the observing direction or the optical axis of the microscope respectively. In one known slit lamp having an illuminating device located between the eye to be examined and the microscope and freely turnable to any desired position independently from the position of the microscope, the light beam may be projected into the eye at a constant angle of incidence from below the optical axis of the microscope, the illuminating device being pivotably mounted in a manner allowing projection of a horizontal and a vertical light beam into the eye. It is a heavy drawback of this known slit lamp that the angle of incidence of the horizontal light beam cannot be varied.

It is a first object of this invention to remove this drawback. The slit lamp according to this invention is broadly characterized in that the illuminating device is located between the eye to be examined and the microscope, the illuminating device being pivotally mounted on a vertical axis and at least partially on a horizontal axis, the inclination of the illuminating device and of the flat light beam projected into the eye therefrom being adjustable relatively to the axis of the said microscope in horizontal and in vertical direction. This arrangement provides for much higher versatility and freedom in examining eyes because a vertical as well as a horizontal light beam may be projected into the eye at any desired angle of incidence within predetermined limits.

The attached drawings illustrate, by way of example, one embodiment of the invention.

FIG. 1 is a side view of the slit lamp,
FIG. 2 is an axial section of the illuminating device taken in the plane comprising the path of the rays.
FIG. 3 illustrates the illuminating device partially in side view and partially in section in a plane transversal to the path of the rays.
FIG. 4 is a sectional view of a portion of the adjusting mechanism of the slit diaphragm of the illuminating device,
FIG. 5 is a front view of the head rest for the patient, partially in section,
FIG. 6 is a section on the line VI—VI in FIG. 5 and
FIG. 7 is a partial section on the line VII—VII in FIG. 6.

The slit lamp has a stationary base or table 1 on which a plate 2 is displaceably supported in a well known manner by means of rollers 3 and an adjusting lever having a ball-shaped supporting face 4. The adjusting lever may be actuated with its upper extension 5 for fine adjustment of the plate 2 on the table 1. A shaft or column 6' is mounted in a supporting sleeve or hub 6 fixed on plate 2, an arm 7 carrying a binocular microscope 8 of conventional construction being pivoted on the said shaft 6'. In the following description and in the claims the axis of symmetry of both optical systems of the binocular microscope is designated as the "axis" or the "optical axis" of the microscope. Above the arm 7 a further arm 9 is pivoted on shaft 6 independently of the arm 7, the arm 9 carrying the illuminating device of the slit lamp. Arms 7 and 9 may be vertically adjusted relatively to the plate 2 by means of an adjusting nut 10, an arm 11 and a hub 12.

A mounting member 13 carrying at its upper end a support 14 for a mirror 15 of the shape illustrated in FIG. 3 is attached to arm 9. A pivot pin 17 (FIGS. 2 and 3) is fixedly inserted into a central widening 16 of the mounting member 13, two hubs or bearing members 18 being pivotally mounted on the projecting end portions of the pivot pin 17. Hubs 18 are axially engaged by friction discs 19 secured against rotation on the fixed pivot pin 17 by means of rectangular end portions of the pivot pin 17, engaging rectangular holes of discs 19 and axially pressed against the hubs 18 by spring discs 20. Therefore, rotation of the hubs 18 on the pivot pin 17 is only possible by overcoming a predetermined frictional resistance. Supporting columns or rods 21 and 22 respectively are fixedly mounted on hubs 18. A bearing body 23 is attached to the lower ends of rods 21, in which a control shaft 23' is pivoted with some friction and may be turned by means of hand knobs 24 when overcoming the friction of the control shaft. A control roller 25 cooperating with a control pin 26 in a manner explained later on is eccentrically pivoted on the control shaft 23'. Rods 22 are thinned at 22' in order not to obstruct the path of the rays of the microscope. A tube 27 of the illuminating device is carried at the upper ends of rods 22, in which tube 27 the objective 28 of the illuminating device is inserted. A further tube 29 is turnably mounted on tube 27, tube 29 carrying the illuminating casing 30 with the incandescent bulb 31 and the condenser 32. On pivot pins 35 of the casing 30 shell-like members 33 are pivoted by means of semi-cylindrical bearing faces 34. Each of the members 33 carries a wedge or knife 36 of a slit diaphragm, and a control roller 37 adapted for cooperation with a control body 38 of the shape shown in FIG. 3. The control body 38 is connected with a control rod 39 engaging the upper face of a flange 40 of a sleeve 41 axially displaceable on the tube 27. The control pin 26 engages the lower face of flange 40. By means of an actuating handle 29' the tube 29 and the illuminating casing attached thereto may be turned relatively to the tube 27 whereby the control rod 39 glides on the flange 40.

The front rest 43 of the head supporting structure for the patient is fixed on the table 1 by means of two columns 42. The chin support of the head rest for the patient is mounted on a carrier 45 guided along the one of the columns 42 and attached to the other of columns 42 by means of a sleeve 46 adjustable in vertical direction by means of an adjusting nut 47 in order to adapt the head rest to the size of the patient's head. A groove 48 having a cross section as seen in FIG. 7 and having guide slots 49 is provided at the underside of carrier 45. A sliding carriage 50 having guide rollers 51 engaging slots 49 is displaceable in linear direction along the groove 48. A threaded sleeve 52 is screwed into the projecting fore end of the carriage 50 and is secured thereto by means of a check nut 53. Balls 54 are inserted in radial bores of the sleeve 52, such balls 54 engaging a supporting rod or column 55 vertically displaceable in the sleeve 52 on one hand and a slightly conical sleeve 56 on the other hand. An actuating nut 57 is screwed on to an upper thread of the sleeve 52 and is adapted for cooperation with the upper thickened end of sleeve 56.

With its lower end, on which a cam 58 of rectangular cross section is formed by lateral millings, the column 55 engages a groove 59 of similar rectangular cross section diametrically extending over the top face of a plate 60 pivoted on the upper end of the column 6'. By means of a coupling member or key 61 screwed to the hub of arm 7 the plate 60 is mechanically linked to the microscope in such a way that the angular discplacements of the microscope 8 are truly transmitted to the plate 60 and consequently to the column 55 of which the cam 58 engages the groove 59 of plate 60. By means of link members 62 and 63 a Hruby lens 64 is connected to the upper end of column 55, the Hruby lens being adjustable to the desired position relatively to the eye 66 to be examined by means of a handle 65 secured on it. Adjustment of the Hruby lens relatively to column 55 to different distances from the eye is allowed by swinging of link member 62 extending in substantially vertical direction and adjustment of the Hruby lens to different levels is allowed by swinging of link member 63 extending in substantially horizontal direction.

With the slit lamp as illustrated in the attached drawings and as described above examination of an eye may be effected in the usual way, whereby light passing through the slit diaphragm 36 is projected through the objective 28 downwardly and is reflected by the mirror 15 into the eye of the patient as schematically illustrated in FIG. 1. The parts are so adjusted and dimensioned that the sharp image of the slit diaphragm appears in the geometrical upward extension of the common pivot axis of the microscope and of the illuminating device, the eye 66 being also placed into this extension of the common pivot axis.

When the slit diaphragm is parallel to the axis of the microscope or to the observing direction, as shown in FIGS. 2 and 3, a thin vertical light beam is projected into the eye by mirror 15. By relative angular displacement between the illuminating device and the microscope on their common pivot column 6' any desired angle between the direction of incidence of the light beam and the observing direction may be adjusted.

When it is required to examine the eye by means of a horizontal light beam the illuminating device is turned by an angle of 90° on tube 27 so that the slit diaphragm is adjusted into a position perpendicular to the observing direction or more strictly perpendicular to a direction comprising the eye and the mirror 15, whereby a horizontal light beam is produced of which the axis is also horizontal so that it enters into the eye in a horizontal direction when the light source is in its vertical position as illustrated in FIG. 1. However, the horizontal light beam, that is the light beam having a flat horizontally elongated cross section, is normally required to enter into the eye at an angle to the horizontal observing direction. In order to obtain such a deviation of the axis of the luminous beam from the horizontal direction the illuminating device is tilted for instance into the inclined position shown in FIG. 2 in dash-dotted lines, and due to the friction between the hubs 18 and the discs 19 the illuminating device will automatically remain in any angular position to which it is brought by manual operation thereof. It will be evident that the illuminating device is turned round its pivot shaft 17 and, as indicated in FIG. 1 this horizontal pivot axis of the illuminating device passes through the locus of the virtual mirror image of the sharp image of the slit diaphragm with reference to the mirror 15, this sharp image being in the eye as mentioned above. It was found that with such a relative positioning of the mirror 15 and the horizontal pivot axis of the illuminating system the sharp image of the slit diaphragm always appears at exactly the same place independently from the inclination of the illuminating device and consequently independently from the angle of incidence of the light beam into the eye relatively to the horizontal observing direction. As shown in FIG. 3 the mirror 15 has such a shape and is so positioned that only its narrower upper portion enters into the optical axis of the microscope whereas the lower, wider portion of the mirror 15 cannot obstruct the passage of the rays from the eye into the microscope. It was also found that the said upper narrower portion of the mirror is sufficient for properly reflecting the vertical light beam normally passing over it whereas the horizontal light beam is usually reflected on the lower wider portion of the mirror as illustrated in FIG. 2.

Summarizing, the slit lamp described in the foregoing makes it possible to project a vertical or a horizontal light beam into the eye at any desired angle within predetermined limits. Besides, the illuminating device and more precisely its slit diaphragm may be turned to any desired angular position between the above described end positions for which a strictly vertical or a strictly horizontal light beam is projected into the eye, and for such intermediate angular positions of the slit diaphragm the eye may be examined with light beams entering into the eye at any desired angle and having a flat cross section elongated in any desired direction between a strictly vertical and a strictly horizontal direction.

One very important condition for satisfactorily realising the invention resides in the feature that the illuminating device is arranged above the axis of the microscope. This is the only possibility of providing an illuminating device having sufficient intensity and being turnable round a horizontal axis, for instance round pivot pin 17. Particularly, when providing the illuminating device above the axis of the microscope, the distance of the objective 28 from the slit diaphragm may be chosen as great as desired and therefore a high intensity of the illumination may be obtained. This arrangement of the illuminating device has the further advantage that it does not heat the examining instruments and the hand knobs as it was the case with prior art slit lamps having an illuminating device located below the microscope axis. The electric bulb 31 is mounted in suspended position and therefore the lifetime of the bulb is very high because the blackening of the bulb, which is particularly intensive on the upper wall portions of the bulb, does not reduce the intensity of the light emitted from the bulb in downward direction within a short time as is the case with bulbs from which the light is emitted in upward direction.

For adjustment of the width of the slit diaphragm one of the control knobs 24 is turned in such a way that the control roller 25 (FIG. 4) is displaced upwards from the position shown in full lines towards the positions indicated in dash-dotted lines in FIG. 4. During this upward motion of the control roller 25 the control pin 26 having a rounding at its lower end engaging the roller 25, is first lifted very slowly and subsequently progressively faster. The displacement of the control pin 26 is transmitted to the sleeve 41 and therefrom to the control rod 39 and to the control body 38, the control rollers 37 being spaced from each other when the body 38 is lifted whereby the members 33 with the wedges or knives 36 of the slit diaphragm are spaced from each other. Therefore a very slow and fine adjustment of the slit width is possible for small slit width whereas the slit is rapidly opened completely once it has reached a certain width.

Any angular displacement of the microscope 8 is transmitted to the Hruby lens 64 through arm 7, connecting member 61, plate 60 and supporting column 55 so that the axis of this lens is automatically adjusted into the optical axis of the microscope 8 for any desired angular position of the microscope. However, the Hruby lens does not, as a whole, imitate the rotatory displacement of the microscope, but due to the linear displacement of the carriage 50 on which the Hruby lens is supported the latter executes a linear displacement in front of the eye but is adjusted to an angular position corresponding to the angular position of the microscope.

When the microscope and the illuminating device are displaced in a vertical direction by means of the control nut 10, this common vertical displacement is also transmitted to the plate 60 and consequently to the supporting column 55 of the Hruby lens 64. On the other hand it has to be avoided that the support 55 is lifted off the plate 60 when the Hruby lens 64 is adjusted to the desired position at the beginning of an examination of the eye. This is prevented by the braking device formed by parts 52, 54 and 56 (FIG. 7), this braking device opposing lifting of the column 55 but allowing downward motion of this column practically without resistance. In its normal position shown in FIG. 7 the slightly conical sleeve 56 is supported on the balls 54. During its upward motion the column 55 tends to rotate the balls 54 in a direction for which the rotating balls tend to shift the sleeve 56 in downward direction thereby increasing the radial pressure of the sleeve 56 against the balls 54 so that a predetermined frictional resistance is to be overcome for lifting the column 55 in its braking device. During a downward motion column 55 tends to rotate the balls 54 in opposite direction so that the balls tend to lift the sleeve 56, the radial pressure of the sleeve 56 against the balls 54 and consequently the braking effect of the balls onto the column being thereby reduced. For certain examinations of the eye it may also be desired to keep the Hruby lens in a predetermined fixed position independently of the position of the microscope. This is possible when the column 55 is lifted to such an extent that its cam 58 leaves the groove 59 of the plate 60 in order to disengage the mechanical connection between the microscope and the Hruby lens. Thereafter nut 57 is screwed down against sleeve 56 so that the latter is urged against the balls 54 with a high pressure thereby entirely blocking the balls 54 and the column 55 in the lifted position. Subsequently the Hruby lens 64 may be adjusted to the desired position.

When the Hruby lens 64 is not required for certain kinds of examination it may be lifted out of its supporting and braking structure and may be reinserted later on when required.

Of course the illuminating device may also be tilted or inclined in a direction opposite to the one shown in FIG. 2 in dash-dotted lines, in order to project the light beam at an angle from a point above the optical axis of the microscope into the eye. If this is desired a symmetrical mirror 15 having a narrow mid portion and wider end portions above and below the optical axis of the microscope may preferably be used, whereby the horizontal light beam would be reflected in exactly the same way above or below the optical axis of the microscope.

Preferably the mirror 15 is mounted exchangeably in its support 14 and a second mirror may be provided having a form corresponding to the lower wider portion of the mirror 15, this second mirror being inserted whenever the path of rays of the microscope must not be obstructed in any way by the mirror.

While I have described and illustrated one embodiment of my invention, I do not wish to unnecssarily limit the scope thereof, but reserve the right to make such modifications and rearrangements of the several parts as may come within the purview of the accompanying claims.

What I claim is:

1. A split lamp for microscopic examination of the eye, of the type having an illuminating device for projecting a flat light beam into the eye and a microscope for observation of the eye, comprising a common vertical pivot axis for the said microscope and the said illuminating device, the said microscope and illuminating device having each a support mounted for independent rotation round the common vertical pivot axis, whereby the illuminating device is arranged for free motion between the microscope and the eye, the said illuminating device having a light source, a slit diaphragm, a reflector having a mirror plane and a lens system so correlated that a sharp image of the said slit diaphragm is produced in the eye, a common horizontal pivot axis on the said support of the illuminating device for the said light source, slit diaphragm and lens system allowing tilting of the said light source, slit diaphragm and lens system to different angular positions relatively to the said reflector which is fixed on the support of the illuminating device, the said horizontal pivot axis passing through the locus of the vertical mirror image of the said sharp image of the slit diaphragm with reference to the said mirror plane so that the said sharp image of the slit diaphragm appears at the same place of the eye for any angular position of the said light source, slit diaphragm and lens system relatively to the said reflector, while the angle of incidence of the said flat light beam into the eye changes in accordance with the angular position of the light source slit diaphragm and lens system relatively to the said reflector.

2. A slit lamp according to claim 1, comprising a vertical position of the said light source slit diaphragm and lens system and inclined positions of the said light source slit diaphragm and lens system, the said reflector being a mirror having a narrow reflecting portion located substantially in the optical axis of the said microscope and at least one wider reflecting end portion, the optical axis of the light source, slit diaphragm and lens system passing through the said narrow or wider portion of the mirror according to whether the said light source, slit diaphragm and lens system are in their vertical position or inclined positions respectively.

3. A slit lamp for microscopic examination of the eye, of the type having an illuminating device for projecting a flat light beam into the eye and a microscope for observation of the eye, comprising in combination a fixed vertical pivot axis, a carrier for the said microscope and a carrier for the said illuminating device being mounted for independent angular displacement round the said fixed vertical pivot axis, the said illuminating device and carrier thereof being mounted for free displacement between the microscope and the eye, a light source, a slit diaphragm and means in the said illuminating device for projecting a light beam from the light source through the slit diaphragm into the eye thereby producing a sharp image of the slit diaphragm in the eye, independent means for rotating the said slit diaphragm for adjusting the direction wherein the image of the slit diaphragm appears in the eye, and the light source and slit diaphragm being mounted on the said carrier of the illuminating device by pivot means allowing continuous angular adjustment of the light source and slit diaphragm from a zero position to a maximum inclined position relative to the said carrier of the illuminating device round a pivot axis permanently horizontal for any angular position of the said carrier of the illuminating device, the said horizontal pivot axis and said illuminating device being so disposed that the vertical component of the angle of incidence of the said light beam continuously changes from zero to a maximum value during the said angular adjustment of the light source and slit diaphragm respectively from their said zero position to maximum inclined position on the said permanently horizontal pivot axis whereby the sharp image of the slit diaphragm is produced at the same place of the eye for any angle of incidence of the light beam, independent adjustment of the microscope and of the illuminating device in horizontal direction being possible by independent rotation of the said carriers on the said vertical pivot axis, independent adjustment of the vertical and horizontal component of the angle of incidence of the light beam into the eye being possible by angular displacement of the light source and slit diaphragm round the said permanently horizontal axis and the said common vertical axis respectively, and independent adjustment of the direction of the image of the slit diaphragm being possible by rotation of the slit diaphragm.

4. A slit lamp for microscopic examination of the eye, of the type having an illuminating device for projecting a light beam into the eye, a microscope for observation of the eye and a Hruby lens adapted to be inserted between the microscope and the eye, comprising a base, a vertical pivot axis on the said base, a carrier for the said microscope and a carrier for the said illuminating device pivoted each on the said common vertical axis, each of said carriers having a hub and supporting means extending from said hub, the said illuminating device being located and freely rotatable between the eye to be examined and the said microscope, the carrier of the microscope being pivoted on the said vertical pivot axis below the carrier of the illuminating device, a light source of the said illuminating device above the said microscope and tiltable round a horizontal axis, a head rest for supporting the patient's head, supporting means for the Hruby lens attached to the said head rest, control means attached to the said Hruby lens, coupling means on top of the said vertical pivot axis engageable with the said control means and motion transmitting means bridging the hub of said carrier of the illuminating device at the side opposite the said supporting means of this carrier and disposed between the said carrier of the microscope and the said coupling means for transmitting rotation of the microscope and its carrier respectively across the said carrier of the illuminating device to the said coupling means and to the said control means engaging the coupling means respectively, angular displacements of the microscope being thereby transmitted through the said carrier of the microscope the said motion transmitting means the said coupling means and the said control means to the Hruby lens.

5. A slit lamp according to claim 4, the said coupling means comprising a plate connected with the microscope carrier and rotatable on the said common vertical pivot axis, a slot in the said plate and a cam at the lower end of the said control means of the Hruby lens slidably engaging the said slot at a place outside the said common pivot axis.

6. A slit lamp according to claim 5, the microscope having an optical axis, the said slot extending in a direction substantially parallel to the said optical axis of the microscope.

7. A slit lamp for microscopic examination of the eye, of the type having an illuminating device for projecting a light beam into the eye, a microscope for observation of the eye and a Hruby lens adapted to be inserted between the said microscope and the eye, comprising a common vertical pivot axis for the said illumination device and the said microscope for angular adjustment of the illuminating device and of the microscope respectively, a carrier not displaceable in the direction of the optical axis of the microscope and having a support for the said Hruby lens, first and second movable link members between the said support and the said Hruby lens, the said first and second link members extending in substantially vertical direction and in substantially horizontal direction respectively, displacement of the said first link member allowing adjustment of the Hruby lens relatively to the said support to different distances from the eye, and displacement of the said second link member allowing adjustment of the said Hruby lens relatively to the said support to different levels, and coupling means between the said support for the Hruby lens and the microscope for transmitting angular displacements of the microscope to the Hruby lens.

References Cited in the file of this patent

UNITED STATES PATENTS

| 1,633,658 | Brown | June 28, 1927 |
|---|---|---|
| 2,235,319 | Jobe | Mar. 18, 1941 |
| 2,622,473 | Littmann | Dec. 23, 1952 |
| 2,837,963 | Binstead et al. | June 10, 1958 |
| 2,879,689 | Gambs | Mar. 31, 1959 |

FOREIGN PATENTS

| 282,187 | Great Britain | Dec. 22, 1927 |
|---|---|---|
| 896,063 | France | Apr. 17, 1944 |
| 276,544 | Switzerland | Oct. 16, 1951 |
| 1,111,761 | France | Nov. 2, 1955 |